United States Patent [19]

Schaller

[11] Patent Number: 4,652,192

[45] Date of Patent: Mar. 24, 1987

[54] EXPANDABLE, PLASTIC PANEL FASTENER

[75] Inventor: Jean-Pierre Schaller, Raynans, France

[73] Assignees: Automobiles Peugeot, Paris; Automobiles Citroen, Neuilly-Sur-Seine, both of France

[21] Appl. No.: 755,342

[22] Filed: Jul. 16, 1985

[30] Foreign Application Priority Data

Jul. 16, 1984 [FR] France .............................. 84 11239

[51] Int. Cl.⁴ .................... F16B 37/04; F16B 21/02; F16B 21/06; F16B 19/10
[52] U.S. Cl. .................................... 411/24; 411/182; 411/347; 411/349; 411/549; 411/508; 411/509; 411/913
[58] Field of Search ............... 411/182, 349, 549, 553, 411/508, 510, 509, 913, 24

[56] References Cited

U.S. PATENT DOCUMENTS

| 3,220,078 | 11/1965 | Preziosi | 411/508 |
|---|---|---|---|
| 3,343,441 | 9/1967 | Van Buren, Jr. | 411/913 |
| 3,476,008 | 11/1969 | Pearson et al. | 411/508 |
| 3,775,927 | 12/1973 | Meyer | 411/508 |
| 3,921,261 | 11/1975 | Fisher | 411/913 |
| 3,954,344 | 5/1976 | Nakama | 411/508 |
| 4,133,246 | 1/1979 | Small | 411/182 |
| 4,208,944 | 6/1980 | Moryl | 411/182 |
| 4,262,394 | 4/1981 | Wright | 411/508 |
| 4,521,148 | 6/1985 | Tanaka | 411/182 |

FOREIGN PATENT DOCUMENTS

| 0038081 | 10/1981 | European Pat. Off. | 411/349 |
|---|---|---|---|
| 1475125 | 5/1969 | Fed. Rep. of Germany . | |
| 2804848 | 8/1979 | Fed. Rep. of Germany | 403/408 |
| 2820218 | 11/1979 | Fed. Rep. of Germany | 403/408 |
| 2354470 | 6/1977 | France . | |
| 2503806 | 10/1982 | France | 403/408 |
| 7900335 | 6/1977 | PCT Int'l Appl. . | |

Primary Examiner—Thomas J. Holko
Assistant Examiner—Carl M. DeFranco, Jr.
Attorney, Agent, or Firm—Burns, Doane, Swecker & Mathis

[57] ABSTRACT

The fastener is in a single piece and adapted to achieve the blind assembly and fixing of sumperimposed elements (A, B) provided with openings (C, D) which have a substantially square-shaped common part in which the fastener is engaged so as to fix together the element (A, B) after rotation of the fastener. For this purpose, it comprises a head (1) so shaped as to pass through the common part and connected to a rectangular-sided stem (3) so as to define two shoulders (4). This stem (3) is enlarged at one end in the form of a foot adapted to cooperate with the shoulders (4) by means of wings (6) of the foot to trap therebetween the elements (A, B). In order to achieve a positive locking, the fastener comprises two lock portions (10) disposed alongside and parallel to the stem (3) for the purpose of locking two branches (9) of the stem which are defined by a slot (8), against two opposed edges of the common part by spreading apart the branches (9) by penetration of a wedge-shaped portion of the lock portions (10) in the slot (8) in the course of the rotation of the fastener. By a positive locking of the assembly, the fastener prevents any vibration which would within time cause the shearing of the component parts of the fastener by maintaining the elements (A, B) in position. However, the latter are slidable relative to each other in any direction in the common plane of their contacting surfaces, as is for example required when the elements have different coefficients of expansion.

12 Claims, 5 Drawing Figures

EXPANDABLE, PLASTIC PANEL FASTENER

The present invention relates to fasteners for blind assembling and fixing of superimposed elements, such as panels, having substantially planar bearing sides provided with openings which have a substantially square-shaped common part in which the fastener is adapted to engage and fix the elements after rotation of the fastener.

The applications of such fateners may be, for example, the fixing of a radiator grill on the front of a vehicle, the fixing of an air deflector under the bumper of a vehicle or the fixing of a trimming panel on a body of a vehicle.

These fasteners comprise a head adapted to pass through said common part of the openings on a diagonal of said common part and connected by at least one projecting shoulder to a stem having a length corresponding to the thickness of the elements to be assembled, said stem being enlarged in the form of a foot adapted to cooperate with the shoulder after rotation of the fastener so as to trap therebetween the elements to be assembled.

Two varieties of fasteners of this type are known. The first fastener has the drawback of relieving the elastic maintaining force after it has been placed in position by a cold flowing or mechanical deformation of the parts of the fastener which achieve the assembly. In the second variety of fastener, which permits a positive locking, the fastener is of a complex structure and has a plurality of component parts which renders it costly to manufacture and complicates th assembling operations.

An object of the present invention is therefore to provide a fastener of the aforementioned type which permits the maintenance of an assembly by a positive locking and consists of a single member so as to result in a cheap fixing member which is simple to mount and stable over a period of time notwithstanding forces to which the elements of the assembly are subjected.

The invention therefore provides a fastener of the aforementioned type which comprises, in the region of the stem and parallel to the latter, at least one lock means which is in one piece with the stem and is capable of entering, when the fastener is rotated, a slot of the stem so as to lock the two branches of the stem defined by said slot, against two opposed edges of the common part of the openings by action on at least one of the other edges and thus provide a positive locking.

According to other features of the invention:

Each lock means which is in one piece with the head of the fastener, is connected to this head by a portion of reduced section which is enlarged into a base projecting from a side of the head.

Each lock means is elastically articulated to the fastener by its portion of reduced section.

Each lock means extends over the major part of the length of the stem in the region of the slot and has, in confronting relation to the slot, a wedge shape adapted to be inserted between the branches by spreading said branches apart.

Further features and advantages of the invention will be apparent from the following description of one embodiment of the invention, given solely by way of example, with reference to the accompanying drawings in which.

Figure 1:
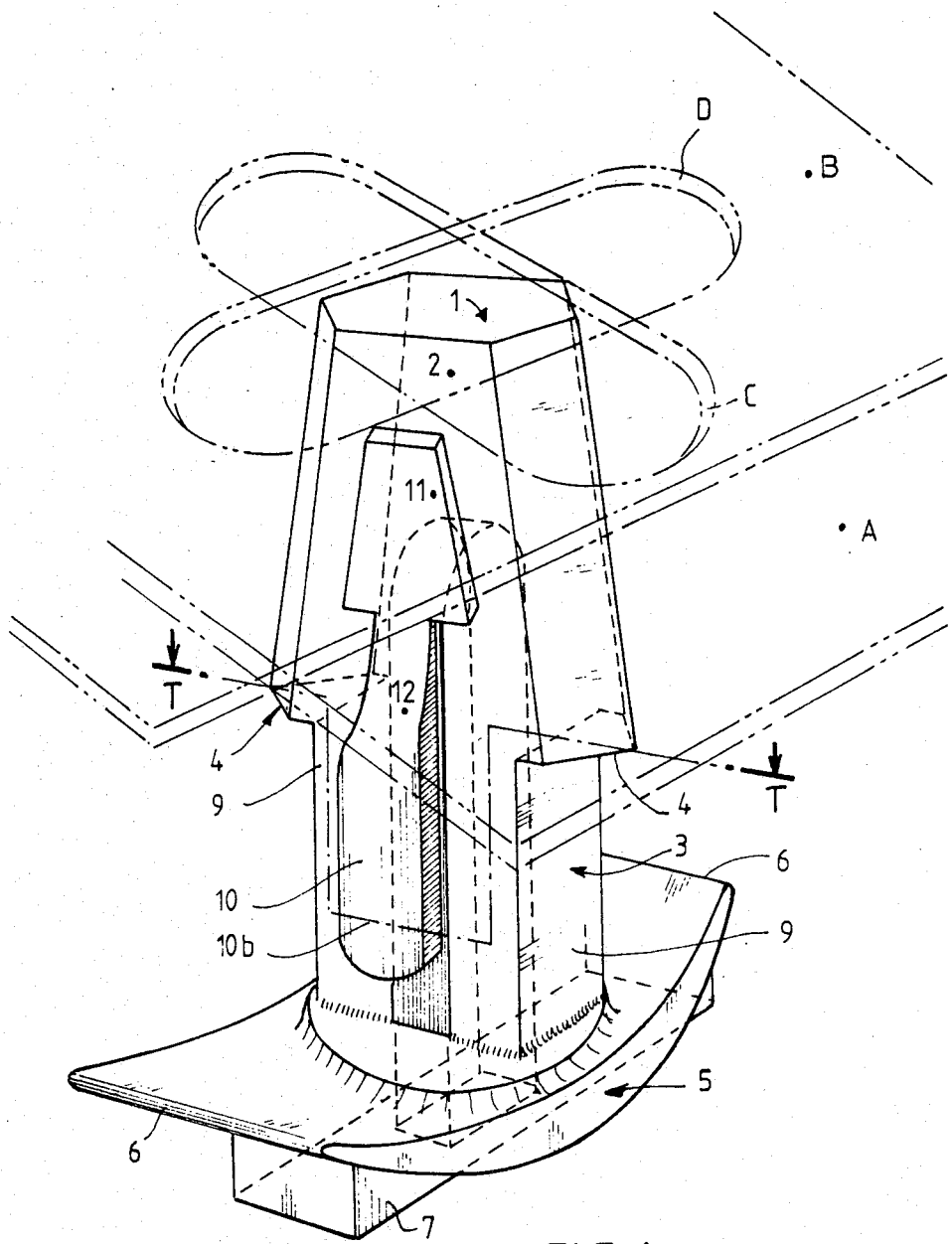
FIG. 1 is a perspective view of a fastener in its position for introduction in the common part of the openings of two superimposed plates.
Figure 2:
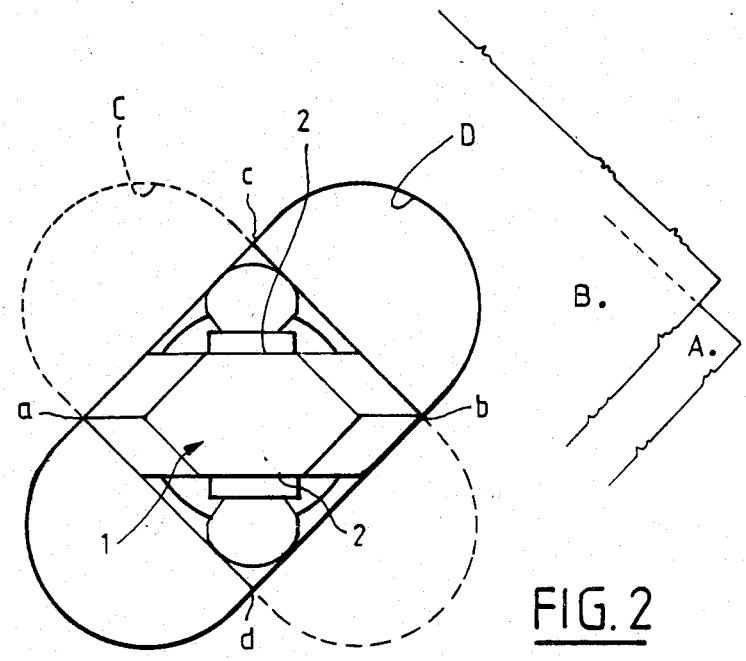
FIG. 2 is a plan view of the fastener shown in FIG. 1 at the head end of the fastener.
Figure 3:
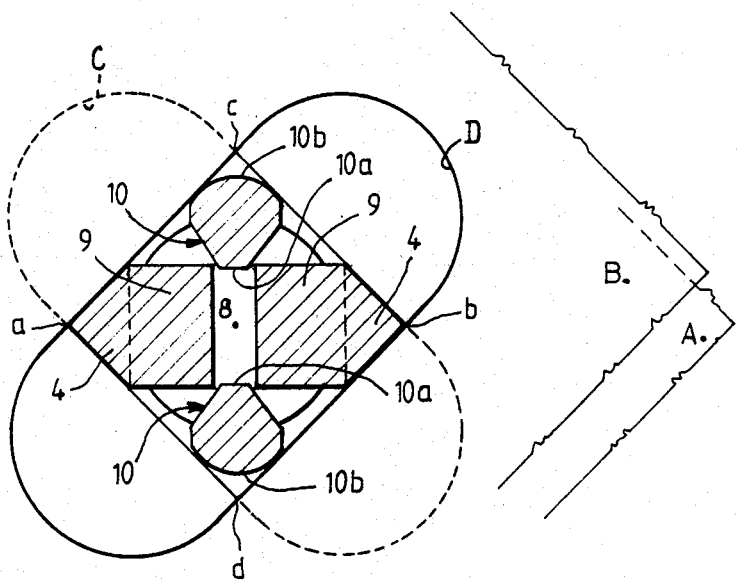
FIG. 3 is a sectional view taken on line T—T of FIG. 1, the fastener having been inserted in the opening.

The fastener shown in FIGS. 1 to 5 is adapted to achieve the blind assembly and the fixing of superimposed elements A, B, having substantially planar bearing sides provided with openings C, D which have a substantially square-shaped common part abcd in which the fastener is adapted to be engaged. This fastener consists of a single member of a material such as, for example, a plastics material such as polyacetal.

The fastener comprises a head 1 in the shape of a truncated pyramid having a hexagonal base and defining a pair of opposed sides 2 which are substantially wider than the sides adjacent thereto and are parallel to each other. The sides 2 of the head 1 are extended so as to form a rectangular-sided stem 3 which defines two triangular shoulders 4 symmetrically arranged relative to the base of the head 1.

The stem 3 is enlarged in the form of a rectangular foot 5 whose width is parallel to the sides 2 of the head 1. This foot 5 is longitudinally curved and has a thickness which gradually decreases on its length on each side of the middle of the latter where the thickness is maximum. On each side of the stem 3, the two portions of the foot 5 of decreasing thickness constitute two wings 6 whose resilience is inversely proportional to their thickness.

The dimensions of the head 1 and the stem 3 of the fastener are such that the distance between the pointed ends of the triangular shoulders 4 corresponds to the length of a diagonal a-b of the roughly square common part abcd of the openings C, D of the superimposed elements A, B (FIG. 2) intended to be assembled, the length of the stem 3 substantially corresponding to the thickness of the assembled elements A, B.

The convex side of the foot 5 includes a projection 7 of rectangular shape whose length is parallel to the length of the foot 5 and which is provided with a rectangular opening which partly extends into the head 1 and forms a slot 8 which divides the stem 3 into two symmetrical branches 9.

The fact that the slot 8 extends through the foot 5 is not in itself related to the functional features of the fastener but is merely due to a moulding process which forms said slot 8 by the positioning of a core which is extracted through the foot 5 after moulding.

Two lock means 10 extend along the stem 3 in a direction parallel to the latter and in confronting relation to the slot 8 for the major part of the length of the stem 3. These lock means 10 have a substantially trapezoidal crosssectional shape whose small base 10a has a dimension less than the dimension of the slot 8 which confronts this small base and whose large base 10b is rounded so as to form a wedge capable of entering the slot 8 between the branches 9 and spreading apart the latter.

These lock means 10 are in one piece with the fastener, to the head 1 of which they are each connected by a portion 12 of reduced section (FIG. 1) which is enlarged into a trapezoidal base portion 11 projecting from the side 2 of the head 1. Each fastener 10 is thus elastically articulated by its portion 12 to the fastener in confronting relation to the slot 8 which it can therefore enter, as will be understood from the following description of the operation of the fastener.

The fastener just described is placed in position in the following manner:

The head 1 of the fastener is inserted in the common part abcd of the openings C, D of the elements A, B in the assembled position (FIG. 2) in such manner that the shoulders 14 are aligned on the diagonal a-b of said roughly square-shaped common part abcd. The fastener is then urged into the openings in this position until the wings 6 bear elastically against the element A in front of these wings (FIG. 3), the lock means 10 bearing against two opposed corners c-d of said common part.

Figure 4:
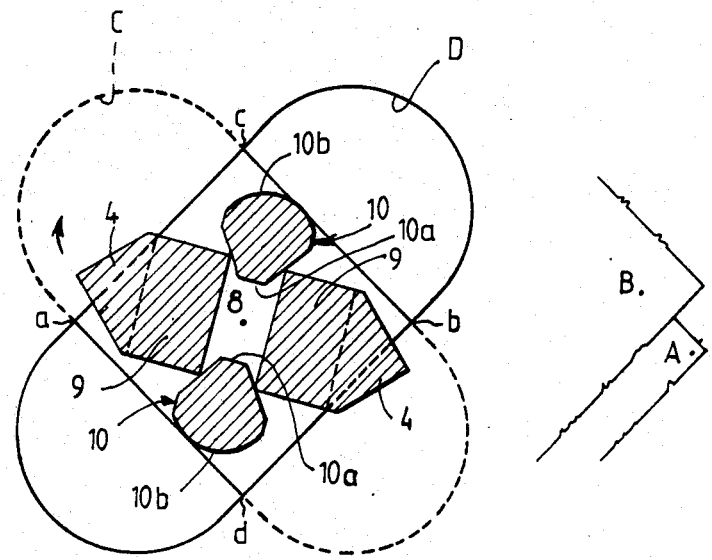
FIG. 4 is a sectional view taken on line T—T of FIG. 1, showing the fastener in the course of locking, slightly rotated in the clockwise direction relative to the position shown in FIG. 3.
Figure 5:
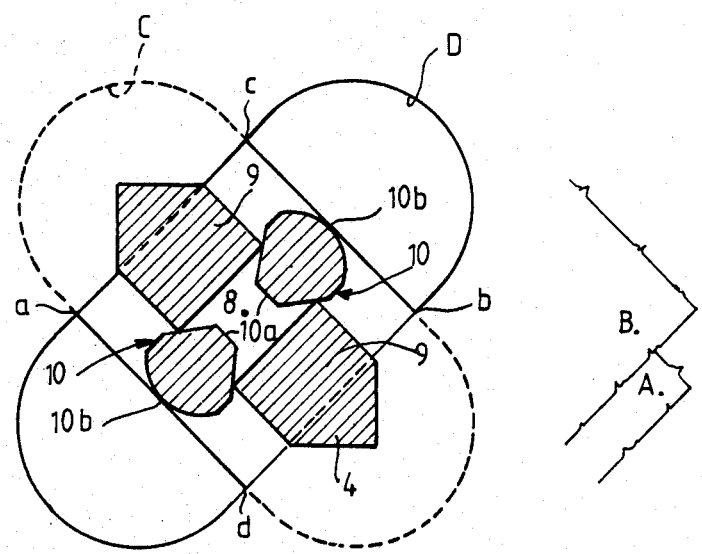
FIG. 5 is a sectional view taken on line T—T of FIG. 1, showing the fastener in the locked position after having rotated the fastener through 45° in the clockwise direction relative to the position shown in FIG. 3.

At this stage, the fastener is rotated through 45° in the clockwise direction as viewed from the foot end of the fastener, by means of the projection 7 which acts as gripping means (FIGS. 4 and 5).

The shoulders 4 are thus made to engage against the element B by forcing the lock means 10, which cooperate by their rounded large base 10b with the sides a-d and b-c of the common part abcd, to enter the slot 8. This has for effect to spread apart the braches 9 and to apply them against the edges a-c and b-d (FIG. 5) of said common part abcd.

The positive locking thus achieved is the result of a mutual blocking or setting of four elements (two lock means 10 and two branches 9) which have a rigid section and are brought together within a undeformable enclosure constituted by the square abcd. There result a rigid anchoring and a very satisfactory resistance to shearing as compared to other known fasteners whose sections have a certain elasticity. Moreover, the fastener according to the invention permits not only a rapid and easy assembly, it allows, by its original design, its disassembly. Further, owing to its combination with the oblong openings disposed perpendicular to each other, the fastener allows the sliding of the elements A and B with respect to each other, in any direction in the common plane of their contacting surfaces, as is required when said elements A and B have different coefficients of expansion.

I claim:

1. A fastener for a blind assembly and fixing of superimposed elements, such as panels, which have substantially planar bearing sides provided with openings which define a substantially square-shaped common part in which common part the fastener is adapted to be engaged and thereby fix together said elements after rotation of the fastener, said fastener comprising a head elongated in cross section, adapted to extend through said common part of the openings on a diagonal of said square shape, a stem having a length substantially corresponding to a total thickness of the elements to be assembled and connected to said head, at least one laterally projecting shoulder defined between said head and said stem, projecting at substantially a right angle to the stem, an enlarged portion in the form of a foot located at an end of said stem remote from said head and cooperative with said shoulder after rotation of the fastener for trapping therebetween the elements to be assembled, a slot in said stem defining two branches one on each side of said slot, the fastener further comprising, in the region of the stem and extending in a direction substantially parallel to the stem, at least one lock means integral with the fastener and capable of entering, upon rotation of the fastener, said slot so as to expand the slot between said two branches transversely of the stem and to lock said two branches against two opposed edges of said common part of said openings by action on at least one of two other opposed edges of said common part and thereby achieve a positive locking of the fastener relative to said elements.

2. A fastener according to claim 1, comprising two said lock means in opposed relation transversly of said stem and cooperative with said slot.

3. A fastener according to claim 1, wherein said lock means is integral with said head and has a portion of reduced section which has an enlargement at an end in the form of a base projecting from a side of the head, said lock means being connected to said head through said portion of reduced section.

4. A fastener according to claim 1, wherein said lock means has a portion of reduced section through which said lock means is elastically articulated to said head.

5. A fastener according to claim 1, wherein the foot is curved, has a thickness which gradually decreases from a central part thereof toward at least one edge thereof, and the one edge is closer to the shoulder than the central part of the foot.

6. A fastener according to claim 1, wherein the stem has a rectangular-sided shape and defines with said head two of said laterally projecting shoulder, said two shoulders being symmetrical and triangular in shape.

7. A fastener according to claim 6, wherein the distance between pointed ends of said triangular shoulders corresponds to the length of a diagonal of said substantially square-shaped common part of said openings in said elements to be assembled.

8. A fastener according to claim 1, comprising a projection on said foot which acts as a gripping means for placing the fastener in position in said elements to be assembled.

9. A fastener according to claim 1 wherein the head has a generally hexagonal shape in cross section.

10. A fastener according to claim 9 wherein the head tapers from one end to the stem such that the head is larger at the stem than at the one end.

11. A fastener for a blind assembly and fixing of superimposed elements, such as panels, which have substantially planar bearing sides provided with openings which have a substantially square-shaped common part in which common part the fastener is adapted to be engaged and thereby fix together said elements after rotation of the fastener, said fastener comprising a head adapted to extend through said common part of the openings on a diagonal of said square shape, a stem having a length substantially corresponding to a total thickness of the elements to be assembled and connected to said head, at least one laterally projecting shoulder defined between said head and said stem, an enlarged portion in the form of a foot located at an end of said stem remote from said head and cooperative with said shoulder after rotation of the fastener for trapping therebetween the elements to be assembled, a slot in said stem defining two branches on each side of said slot, the fastener further comprising, in the region of the stem and exending in a direction substantially parallel to the stem, at least one lock means which is in one piece with the fastener and is capable of entering, upon rotation of the fastener, said slot so as to lock said two branches against two opposed edges of said common part of said openings by action on at least one of two other opposed edges of said common part and thereby achieve a positive locking of the fastener relative to said elements, wherein said lock means extends over the major part of the length of the stem in alignment with said slot and has in confronting relation to said slot a wedge-shaped portion capable of being inserted between said branches and spreading them apart.

12. A fastener for a blind assembly and fixing of superimposed elements, such as panels, which have substantially planar bearing sides provided with openings which have a substantially squareshaped common part in which common part the fastener is adapted to be engaged and thereby fix together said elements after rotation of the fastener, said fastener comprising a head adapted to extend through said common part of the openings on a diagonal of said square shape, a stem having a length substantially corresponding to a total thickness of the elements to be assembled and connected to said head, at least one laterally projecting shoulder defined between said head and said stem, an enlarged portion in the form of a foot located at the end of said remote from said head and cooperative with said shoulder after rotation of the fastener for trapping therebetween the elements to be assembled, a slot in said stem defining two branches on each side of said slot, the fastener further comprising, in the region of the stem and extending in a direction substantially parallel to the stem, at least one lock means which is one piece with the fastener and is capable of entering, upon rotation of the fastener, said slot so as to lock said two branches against two opposed edges of said common part of said openings by action on at least one of two other opposed edges of said common part and thereby achieve a positive locking of the fastener relative to said elements, wherein two of said lock means are provided in opposed relation transversely of said stem and cooperative with said slot, and wherein each lock means extends over the major part of the length of the stem in alignment with said slot and has in confronting relation to said slot a wedge-shaped portion capable of being inserted between said branches and spreading them apart.

* * * * *